United States Patent [19]

Ohkubo et al.

[11] Patent Number: 4,593,324
[45] Date of Patent: Jun. 3, 1986

[54] IMAGE DATA STORING DEVICE

[75] Inventors: Tetsuo Ohkubo; Hiroyuki Kataoka, both of Kanagawa, Japan

[73] Assignee: Fuji Xerox Co., Ltd., Tokyo, Japan

[21] Appl. No.: 780,241

[22] Filed: Sep. 26, 1985

Related U.S. Application Data

[63] Continuation of Ser. No. 368,236, Apr. 13, 1982, abandoned.

[30] Foreign Application Priority Data

Apr. 14, 1981 [JP] Japan .................. 56-55110

[51] Int. Cl.⁴ .......................... H04M 1/00; G06F 9/00
[52] U.S. Cl. .................................. 358/261
[58] Field of Search ................ 364/200, 900; 358/261

[56] References Cited

U.S. PATENT DOCUMENTS

| | | | |
|---|---|---|---|
| 2,853,698 | 9/1958 | Nettleton et al. | 364/200 |
| 3,168,723 | 2/1965 | Foin et al. | 364/200 |
| 3,599,178 | 8/1971 | Jackson et al. | 364/900 |
| 4,021,649 | 5/1977 | Fort et al. | 364/900 |
| 4,232,375 | 11/1980 | Paugstat et al. | 364/900 |
| 4,376,933 | 3/1983 | Saran et al. | 364/900 |
| 4,382,286 | 5/1983 | Mitchell et al. | 364/900 |
| 4,386,416 | 5/1983 | Giltner et al. | 364/900 |

OTHER PUBLICATIONS

CCITT, Yellow Book, vol. VII—Fascicle VII.2, Telegraph and Telematic Services, Terminal Equipment, Nov. 1980, pp. 222-235.

Computer Storage Systems and Technology, Richard E. Matick, ©1977, J. Wiley & Sons, pp. 540-546.

Microcomputer Architecture and Programming, John F. Wakerly, ©1981, J. Wiley & Sons, pp. 340-344.

*Primary Examiner*—Gareth D. Shaw
*Assistant Examiner*—John G. Mills
*Attorney, Agent, or Firm*—Sughrue, Mion, Zinn, Macpeak and Seas

[57] ABSTRACT

An image data storing device according to the invention includes a data compression/expansion device between the main memory of a CPU and an auxiliary memory device, such that image data are transmitted between the main memory and the data compression/expansion device, while data which are obtained by compressing the image data are transmitted between the data compression/expansion device and the auxiliary memory device.

3 Claims, 2 Drawing Figures

IMAGE DATA STORING DEVICE

This application is a continuation of Ser. No. 368,236 filed Apr. 13, 1982, which is now abandoned.

BACKGROUND OF THE INVENTION

This invention relates to an image data storing device in which binary image data are stored in a memory means having a large capacity.

FIG. 1 outlines a conventional image processing device. In FIG. 1, reference numeral 1 designates an image input device; 2, a large capacity memory unit; 3, an image output device; 4, a CPU, and 5, the main memory of the CPU 4. In this image processing device, an image is read as binary signals by the image input device 1, and is stored in the large capacity memory unit 2 through the main memory 5. Thereafter, in response to an instruction from the CPU, the binary signals are suitably processed, so that the image is outputted by the image output device 3.

In order to read an image with high quality with the image input device, each picture element shoud be about 1/12 mm in size. For instance, if the entire area of a sheet of "B4" size (364 mm×257 mm) is read with 1/12 mm$^2$ per picture element, then the amount of data on one sheet is about 1.7 M bytes.

In general, a magnetic disc is employed as the large capacity memory unit Z. In the case where an 8-inch commercially available disc is employed as the large capacity memory unit 2, the memory capacity is about 40 M bytes at maximum. Therefore, if the conventional image processing device is used to store an image of the aforementioned "B4" sized sheets, the magnetic disc can store data for no more than twenty-three such sheets.

Recently, a laser scan type image printer has been developed for use as the image output device 3. That is, the image output device may operate at a high speed, and some such image output devices have an average video rate of about 20 M bits/sec. On the other hand, the data transfer rate between the large capacity memory unit 2 and the main memory 5 is of the order of 7 M to 8 M bits/sec. Therefore, the data transfer rate between the large capacity memory unit 2 and the main memory 5 becomes an obstruction or bottleneck in the operation of outputting the image stored in the large capacity memory unit 2 from the image output device 3. Thus, the conventional image processing device is insufficient in systematic capability. This is another drawback of the conventional device.

SUMMARY OF THE INVENTION

An object of this invention is to provide an image data storing device in which the above-described drawbacks accompanying the conventional image processing device have been eliminated, and wherein a large amount of image data can be stored, and the image data inputted and outputted at high speed.

An image data storing device according to the invention includes a data compression/expansion device between the main memory of a CPU and an auxiliary memory device, such that image data are transmitted between the main memory and the data compression/expansion device, while data which are obtained by compressing the image data are transmitted between the data compression/expansion device and the auxiliary memory device.

DETAILED DESCRIPTION OF THE PREFERRED EMBODIMENTS

Figure 2:
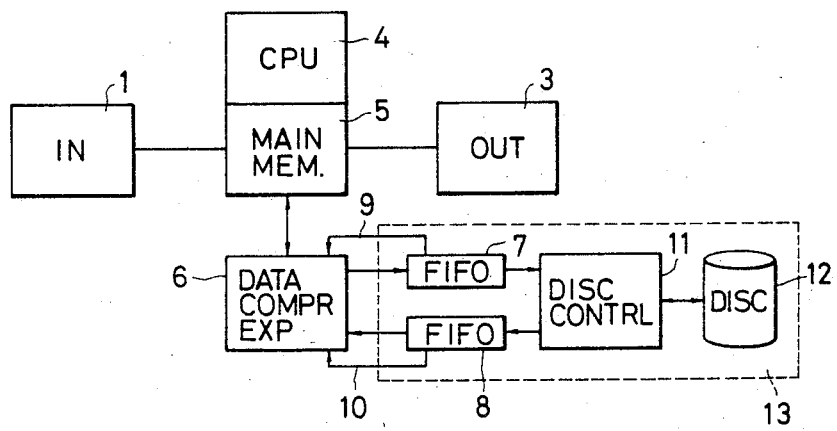
FIG. 2 is a block diagram illustrating one example of an image data storage device according to this invention.

FIG. 2 is a block diagram showing one example of an image data memory device according to the invention.

Figure 1:
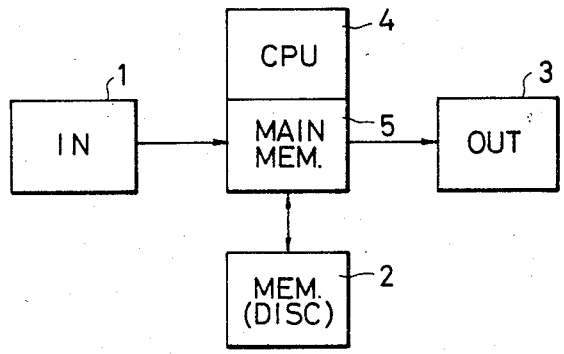
FIG. 1 is a block diagram of a conventional image data storage system.

In FIG. 2 reference numerals 1, 3, 4 and 5 designate those items dcsignated by the same reference numerals in FIG. 1; 6, a data compression/expansion device; 7 and 8, FIFO (first-in first-out) memories; 9 and 10, connecting lines; 11, a magnetic disc control device; 12, a magnetic disc; and 13, an auxiliary memory device. The auxiliary memory device 13 is made up of the FIFO memories 7 and 8, the magnetic disc control device 11 and the magnetic disc 12.

In the image processing device thus arranged, the main memory 5 has a memory capacity of 2 M bytes and has stored therein binary image data obtained by reading data from a sheet of "B4" size in 1/12 mm units. The main memory 5 is the main memory of the CPU 4 and is accessed by the data compression/expansion device 6 according to a conventional direct memory access system.

When an instruction for storing binary image data in the magnetic disc is issued to the data compression/expansion device 6 and the magnetic disc control device 11 by the CPU (according to a conventional method (not illustrated)), the data compression/expansion device 6 reads image data out of the main memory 5 successively. The image data thus read are compressed by one-dimensional run length coding, and are then applied to the FIFO memory 7. The FIFO memory 7 has a capacity of n bits. When the FIFO memory 7 receives n bits of data from the data compression/expansion device 6, it sends a "FIFO Full 1" signal (hereinafter referred to as "an FF 1 signal") to the data compression/expansion device 6 through the connecting line 9, so that data transfer and data compression are suspended.

On the other hand, similar to the operation of a commercially available magnetic disc control device, the magnetic disc control device 11 carries out format control and CRC check data formation. The magnetic disc control device 11 is instructed to store the image data by the CPU 4 as was described above. Therefore, after moving the head according to the cylinder address and track address in the instruction, the magnetic disc control device 11 fetches the data from the FIFO memory 7 for storage in the magnetic disc 12. Upon the start of this operation, the FF 1 signal becomes inactive, because the data has been taken out of the FIFO memory 7. Therefore, the data compression/expansion device 6 again carries out data transfer to the FIFO memory 7 and data compression.

An ordinary image is compressed by 0.1 to 0.3 by one-dimensional run length coding. In the case where an average transfer rate in storing compressed data in the magnetic disc 12 is 8 M bits/sec, the number of picture elements per line of an image is m bits and the standard compression rate is 0.2, the one-line minimum transfer time T is 0.2 m/8 microseconds.

Where the access unit of the data compression/expansion device is 16 bits and the main memory 5 has a cycle time of 250 ns, the transfer rate between the main memory 5 and the data compression/expansion data 6 is 40 M bits/sec. Therefore, if the read data are applied to the FIFO memory 7 after being compressed by 0.2 by the data compression/expansion device 6, then the transfer rate between the device 6 and the memory 7 is $40 \times 0.2 = 8$ M bits/sec, which is equal to the aforementioned average transfer rate. When the compression rate is increased to higher than 0.2, for instance to 0.1, then the amount of data is further decreased. In this case, a fill code may be inserted until the compression rate reaches 0.2, according to the one-dimensional run length coding system, and therefore the amount of the useless portion is somewhat increased in the image data on the disc; however, the problem in the control can be solved thereby.

In the case where the compression rate is of the order of 0.3, the amount of data applied to the FIFO memory 7 is increased, that is, more data than that which can be transferred to the disc 12 from the FIFO memory 7 are inputted. Therefore, the FF 1 signal is issued, so that data transfer to the FIFO memory 7 and data compression are suspended. Thus, there is no problem in the control.

As is apparent from the above description, the image data in the main memory 5 are stored in the magnetic disc, after being compressed at a maximum compression rate of 0.2 by the data compression/expansion device 6. Therefore, the amount of image data stored in this case may be five times that in the case where no compression is effected. Furthermore, the image data transfer rate between the main memory 5 and the data compression-/expansion device 6 is greatly increased, i.e. to 40 M bits/sec at maximum.

In the case when the compressed image data stored in the magnetic disc 12 are loaded in the main memory 5, the image data storing device operates as follows:

When a read instruction is applied to the disc control device 11 and the data compression/expansion device 6 by the CPU 4, the compressed data are read out of the magnetic disc 12 by the disc control device 11, and are written in the FIFO memory 8.

When the data have been written in the FIFO memory 8, a "FIFO EMPTY" signal which is otherwise applied to the data compression/expansion device 6 through the connecting line 10 from the FIFO memory 8 is made inactive. Upon detection of this change, the data compression/expansion device 6 extracts data from the FIFO memory 8. In the device 6, the image data compressed by one-dimensional coding are expanded into the original image data. The image data thus processed are written in the main memory 5 according to the direction access system. Similarly as when the data is read from the main memory, the data can be written at a data transfer rate of about 40 M bits/sec at maximum. The data compressed at the maximum rate of 0.2 is restored into the original image data at a sufficiently high speed.

In the above-described embodiment, the data compression/expansion device 6 employs a one-dimensional run length coding system; however, this system may be replaced by a two-dimensional coding system (G III standard) employed as a standard system in CCITT, or by other systems having data compression and expansion functions.

In this embodiment, the standard compression rate is 0.2; however, it should be noted that the standard compression rate is determined from the employed coding system and the ratio of the data transfer rate between the main memory and the data compression/expansion device to the data transfer rate between the data compression/expansion device and the disc. The standard compression rate should be set to an optimum value, taking these two factors into account.

As was described above, according to the invention, a data compression/expansion device is provided between the main memory of the CPU and the auxiliary memory. Therefore, the invention has an effect such that the image data transfer rate between the main memory and the auxiliary memory can be increased, and a large amount of image data can be stored in the auxiliary memory.

What is claimed is:

1. An image data storage system comprising a central processing unit connected to a main memory and connected to input/output devices, including:
    an auxiliary data storage system having a magnetic storage disc, read/write control means for said magnetic storage disc and a disc controller;
    a data compression/expansion device provided between said main memory and said auxiliary memory device, which compresses data by means of a one dimension run length coding technique with the compression rate of said compression/expansion device being selected according to the ratio between the data transfer rate from said memory to said compression/expansion device and the data transfer rate from said compression/expansion device to the storage media of said magnetic storage disc;
    said auxiliary memory device comprising a pair of FIFO memories for transfer of data in either direction between said magnetic storage disc and said compression/expansion device;
    wherein image data are transmitted between said main memory and said data compression/expansion device at the same time that compressed data which are obtained by compressing said image data are transmitted between said data compression/expansion device and said auxiliary memory device.

2. An image data storage device, comprising;
    a CPU having a main memory, an auxiliary memory device including an auxiliary data storage system having a magnetic storage disc, read/write control means for said magnetic storage disc and a disc controller, and a data compression/expansion device provided between said main memory and said auxiliary device for compressing data by one-dimensional run length coding, wherein image data are transmitted between said main memory and said data compression/expansion device, while data which are obtained by compressing said image data are transmitted between said data compression/expansion device and said auxiliary memory device, said auxiliary memory device, said auxiliary memory device comprising a pair FIFO memories for transfer of data in either direction between said magnetic storage disc and said compression-/expansion device.

3. An image data storage device, comprising;
    a CPU having a main memory, an auxiliary memory device including an auxiliary data storage system having a magnetic storage disc, read/write control means for said magnetic storage disc and a disc controller, and a data compression/expansion device provided between said main memory and said auxiliary device for compressing data by two-dimensional run length coding, wherein image data are transmitted between said main memory and said data compression/expansion device, while data which are obtained by compressing said image data are transmitted between said data compression/expansion device and said auxiliary memory device, said auxiliary memory device, said auxiliary memory device comprising a pair FIFO memories for transfer of data in either direction between said magnetic storage disc and said compression/expansion device.

* * * * *